United States Patent Office 3,605,847
Patented Sept. 20, 1971

3,605,847
PNEUMATIC TIRES
Vernon E. Gough, Croyde, near Braunton, North Devon,
England, assignor to Dunlop Holdings Limited, St.
James, London, England
Filed July 7, 1969, Ser. No. 839,548
Claims priority, application Great Britain, July 9, 1968,
32,704/68
Int. Cl. B60c 11/12
U.S. Cl. 152—209          5 Claims

ABSTRACT OF THE DISCLOSURE

A pneumatic tire having a tread comprising ribs, defining at least one intermediate groove. At least one of the ribs is provided with slots and the radial extent of said slots is substantially greater than the radial extent of the intermediate groove.

---

This invention relates to pneumatic tires and is an improvement thereto.

Pneumatic tires are generally well-known comprising a tread having ribs, blocks or the like which are provided with a plurality of slots to improve wet grip. However, in cases known hitherto wherein the pneumatic tire is provided with grooves the depth of the slots is less than the groove depth.

Recent legislation in some of the major motoring countries provides that a pneumatic tire is considered unsafe when the groove depth reaches a figure as low as, for example, 1 mm. As already indicated, pneumatic tires in this condition of wear are in general left with a negligible slot depth in the tread, and consequently, wet grip is substantially impaired.

In addition, the water-removing capacity of a conventional tire of the type specified in the unworn or partially worn condition is not as efficient as it is potentially capable of being, by virtue of the aforementioned limited depth of the slots.

It is an object of the present invention to reduce or substantially eliminate the aforesaid difficulties.

According to the present invention a pneumatic tire having a tread comprising ribs, blocks or the like defining at least one intermediate groove, at least one of said ribs, blocks or the like being provided with slots, the radial extent of said slots being substantially greater than the radial extent of the said intermediate groove.

It should be understood that the term "slot" as used herein, in addition to its normal meaning, also covers any type of hole, e.g. of cylindrical form but does not cover cuts or sipes wherein there is no volumetric capacity defined between the walls of the cut or sipe to accept drained water.

The expression "deep slots" will be applied herein to describe said slots, the radial extent of which is substantially greater than that of the intermediate groove.

The expression "conventional slots" where used will apply to those slots the radial extent of which is less than that of the intermediate groove.

Preferably all of the said ribs, blocks or the like are provided with deep slots.

Alternatively, some of the said ribs, blocks or the like may be provided uniquely with conventional slots, or some or all of the said ribs, blocks or the like may be provided with both conventional slots and deep slots.

Preferably the base of the deep slots is disposed between a position 1 mm. below the groove depth and a position located mid-way between the groove base and the radially outermost reinforcement ply of the tire.

The slots may or may not connect with an adjacent groove.

At least some of the slots may be provided with bulbous bases and said bases may be circular in cross-sectional view.

According to the invention also there is provided a mould piece for moulding a pneumatic tire, comprising means for moulding the grooves of a pneumatic tire and blades for moulding slots of the pneumatic tire said blades being of greater radial extent than the said means for moulding the grooves.

Said deep slots may be formed in the tread of a new tire or in the retread of a worn tire to which a retread has been applied.

One embodiment of the invention will now be described in more detail by way of example with reference to the accompanying drawings wherein.

Figure 2:
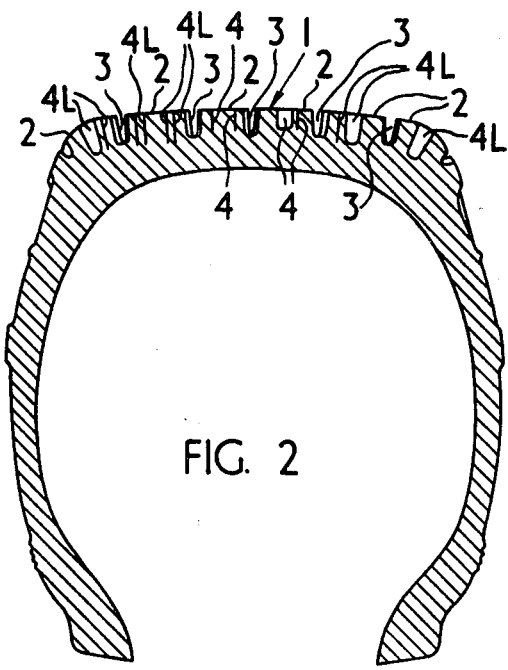
FIG. 2 illustrates a section on the line A—A of FIG. 1.
Figure 1:
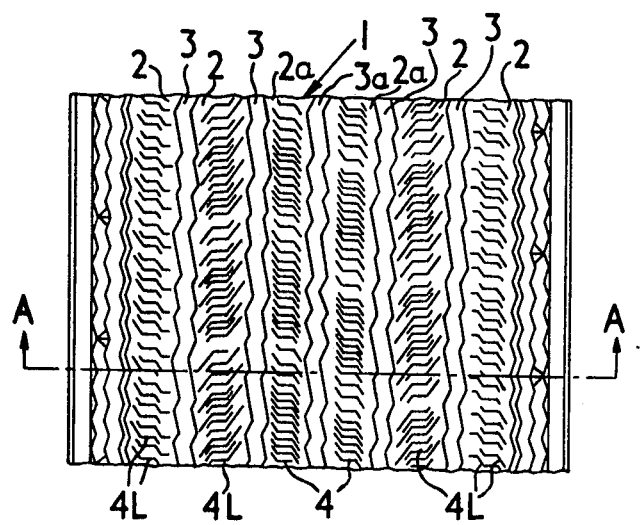
FIG. 1 illustrates a fragmentary diagrammatic plan view of a tire tread according to the embodiment of the invention.

A motor car pneumatic tire tread 1 is provided with six generally circumferentially-extending ribs 2 and 2a and five generally circumferential grooves 3 and 3a located between each pair of ribs. The walls of the grooves 3 and 3a are, in plan view of the tread, of zig-zag formation, opposite walls in each groove having parallel faces so that the width of the grooves is substantially constant. The groove depth is approximately 8 mm.

On the ground-contacting surface of each rib, there is provided a plurality of slots 4 and 4L, moulded into the tread by means of 0.33 mm. thick knife blades (not shown) secured to the mould matrix used in producing the tread pattern. Each of the slots 4 in the pair of ribs 2a adjacent the central groove 3a extends to a depth substanially equal to the depth of the grooves i.e. 92% of said depth. Each of the slots 4L in the remaining ribs extends to a depth substantially greater than the depth of the grooves 3 and 3a i.e. 2 mm. greater than the groove depth. Each slot 4 and 4L is of three-leg or four-leg zig-zag shape in plan view. The opposed sidewalls of each slot are substantially parallel so that the width of each slot is substantially constant and the length of the legs of each zig-zag are varied, the varied lengths of slot being randomly arranged together. None of the slots extend into the circumferential grooves.

The greater depth of some of the slots with respect to an adjacent groove enables a tire, when approaching the legal limit of groove depth to retain to a substantial extent, the wet grip of the tire.

In addition, the greater volumetric capacity of said slots enables the water removing capacity of the tire to be increased compared with a tire similar in all respects except for the greater depth of said slots.

Having now described my invention what I claim is:
1. A pneumatic tire having a tread comprising ribs, defining at least one intermediate groove, at least one of said ribs being provided with slots, the radial extent of said slots being substantially greater than the radial extent of the said intermediate groove.

2. A pneumatic tire according to claim 1 wherein the base of the said slots is disposed between a position 1 mm. below the groove depth and a position located mid-way between the groove base and the radially outermost reinforcement ply of the tire.

3. A pneumatic tire according to claim 1 wherein the slots connect with an adjacent groove.

4. A pneumatic tire according to claim 1 wherein each said slot is provided with a bulbous base.

5. A pneumatic tire according to claim 1 wherein all of the said ribs are provided with said slots.

References Cited

UNITED STATES PATENTS 3,332,465  7/1967  French _____ 152—209

JAMES B. MARBERT, Primary Examiner